Maydole & Morse.
Mower.
No 63
No 1168
Reissued Apr. 2, 1861.
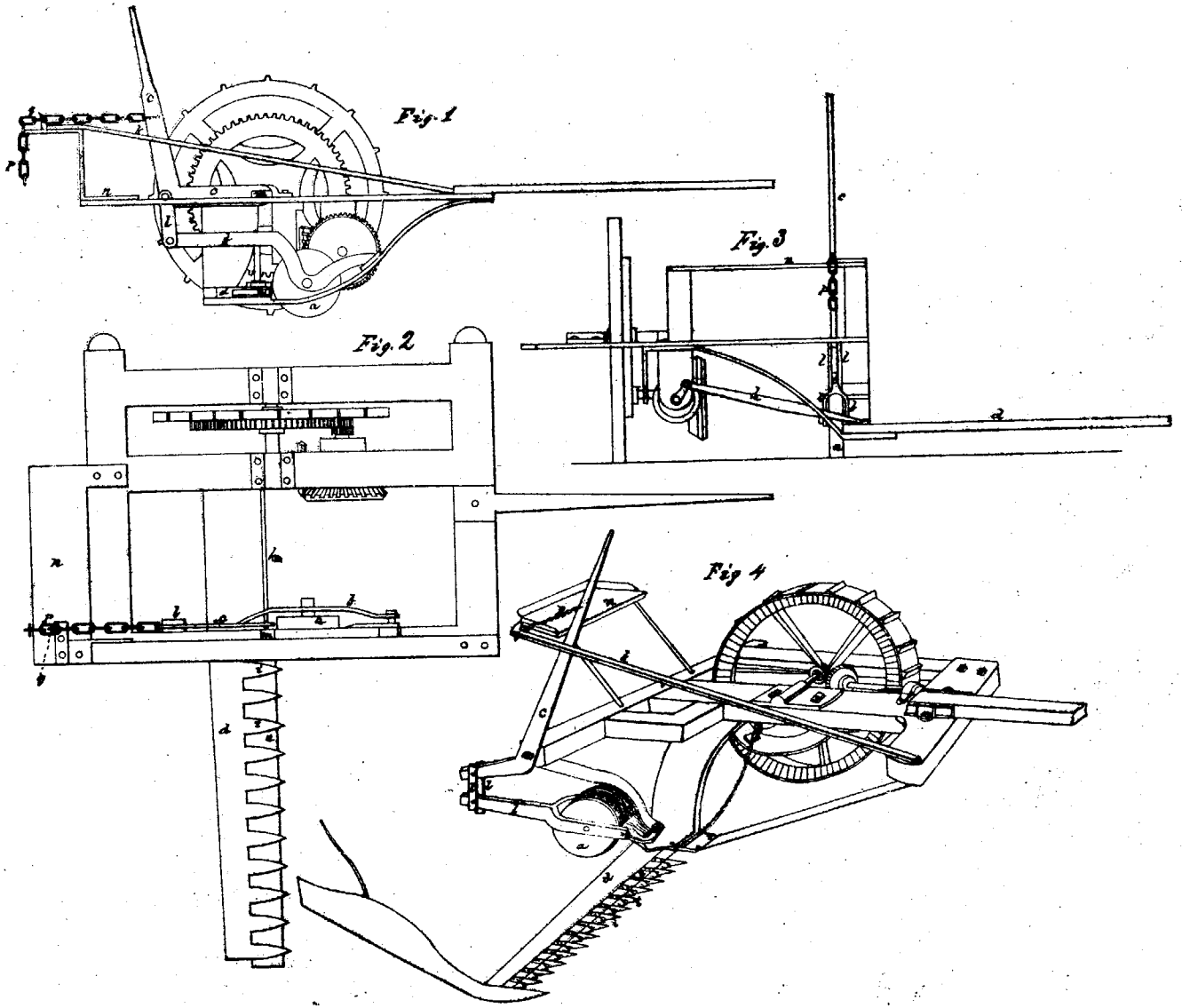

UNITED STATES PATENT OFFICE.

JAMES H. MAYDOLE AND A. W. MORSE, OF EATON, NEW YORK, ASSIGNOR TO ALBERT W. MORSE, OF SAME PLACE.

IMPROVEMENT IN GRASS-HARVESTERS.

Specification forming part of Letters Patent No. 12,363, dated February 6, 1855; Reissue No. 1,168, dated April 2, 1861.

*To all whom it may concern:*

Be it known that JAMES H. MAYDOLE and ALBERT W. MORSE, of Eaton, in the county of Madison and State of New York, did obtain Letters Patent bearing date the 6th day of February, 1855, for a new and useful Improvement in Grass-Harvesters; that the said patent has been wholly assigned to the said ALBERT W. MORSE; and be it further known that, in consequence of the said MORSE'S entertaining the opinion that the said patent is partially invalid in consequence of a defective specification, he has surrendered the same and asked for a reissue thereof upon the following specification of what he verily believes to be the true nature of the invention which might originally have been covered by the said MAYDOLE and MORSE'S patent.

In the accompanying drawings, Figure 1 is a side view, Fig. 2 a top view, and Fig. 3 a rear elevation, of the improved harvesting-machine or grass-harvester which is described in the aforesaid patent. Fig. 4 represents a slightly-modified form of the said harvester, as shown in the caveat filed in this case on the 6th day of October, 1854.

The following are the essential features of novelty in the aforesaid improved grass-harvester: First, such an arrangement of an operative arm or lever with the finger-bar of said harvester, which is connected at one end only with the frame thereof, as will enable the said finger-bar to be elevated or lowered at pleasure, or be held at any desired height, and when not thus operated upon will allow the finger-bar to rest upon or close to the ground; second, the location of the above-mentioned operative arm or lever in near proximity to the driver's seat or in such a position relatively to the other parts of the said improved grass-harvester as to bring it within convenient reach of the driver of the harvester; third, the location of the brace-bar *k* (or the equivalent thereof) in such a postion relatively to the other parts of the frame and the seat of the harvester as will furnish the requisite degree of strength and stability in a lateral direction to the above-mentioned arm or lever which is connected to the finger-bar of said harvester; fourth, the roller *a*, located near the inner shoe and so arranged in relation to the finger-bar and cutters as to ride over and press down the cut grass, which would otherwise be liable to clog the machine, and also aid in passing over hollows or "dead-furrows," as hereinafter described.

The roller *a* is pivoted between the united double levers *b b*. The forward ends of the said double levers *b b* are jointed to the machine in such a manner as to bring the roller *a* immediately in front of the pitman *h*, and nearly on a line with the extremities of the fingers *i i*, and in near proximity to the inner shoe, as shown in Figs. 1 and 2. The rear ends of the double levers *b b* are jointed to the angular lever *c* by means of the bridle-pieces *l l*. The horizontal portion of the angular lever *c* is jointed to the frame of the machine at *m*, and the upright portion of the lever rises in near proximity to the seat *n* at the right hand of the driver. There is a chain, *p*, attached to the upright portion of the lever *c*, and a catch-pin, *q*, on the seat, to which said chain may be hooked as the cutter-bar is raised from the ground to the desired height and held in such position; or the person operating the machine, by taking hold of the upright portion of said lever to which said chain is attached, can at any moment immediately elevate said cutter-bar and depress and control the same with much facility. There is a brace-bar, *k*, running from the right-hand side of the driver's seat forward and outside of the upright portion of said lever, against which it is supported, to the front part of the frame of the machine. This brace serves to steady and strengthen said lever, and is useful in enabling the driver to maintain his position, and particularly upon side hills and on uneven ground.

The features of novelty in the aforesaid improved grass-harvester which the assignee of said invention believes to be new, and desires to secure by Letters Patent, are the following:

1. Combining with the finger-bar of said grass-harvester an adjustable arm or lever, *c*, provided with a roller or other means of passing easily over the ground, for the purpose of sustaining the finger-bar at any required distance from the ground or allowing it to rest upon the ground at pleasure, for the purpose herein set forth.

2. The arrangement of the aforesaid arm or lever *c* in near proximity with the driver's seat, for the purpose of operating the finger-bar, in the manner substantially as described.

3. The combination of the brace-bar *k* with the frame of the said improved grass-harvester, when the said bar is arranged in such a manner as to form a lateral support to the operating arm or lever *c*, substantially as described.

4. The adjustable wheel *a*, which serves as a fulcrum for raising the cutting apparatus, in combination with the inner shoe, substantially as set forth, and for the purposes specified.

ALBERT W. MORSE,
*Assignee of James H. Maydole and Albert W. Morse.*

Witnesses:
RICHARD M. DAVIS,
C. W. BURRITT.